Sept. 25, 1945. A. EFRON 2,385,337
FILING FOLDER
Filed March 8, 1944 2 Sheets-Sheet 1
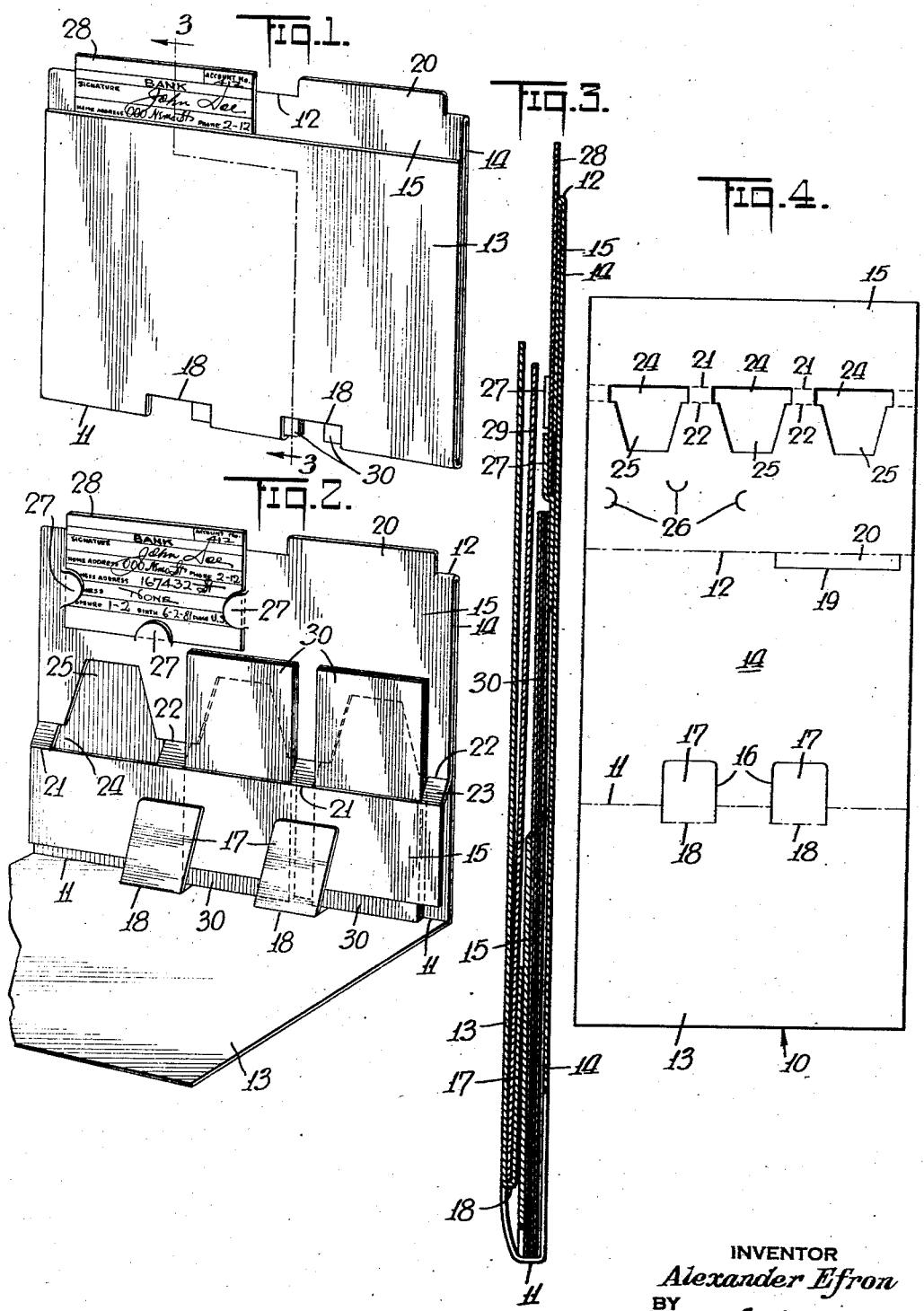
INVENTOR
Alexander Efron

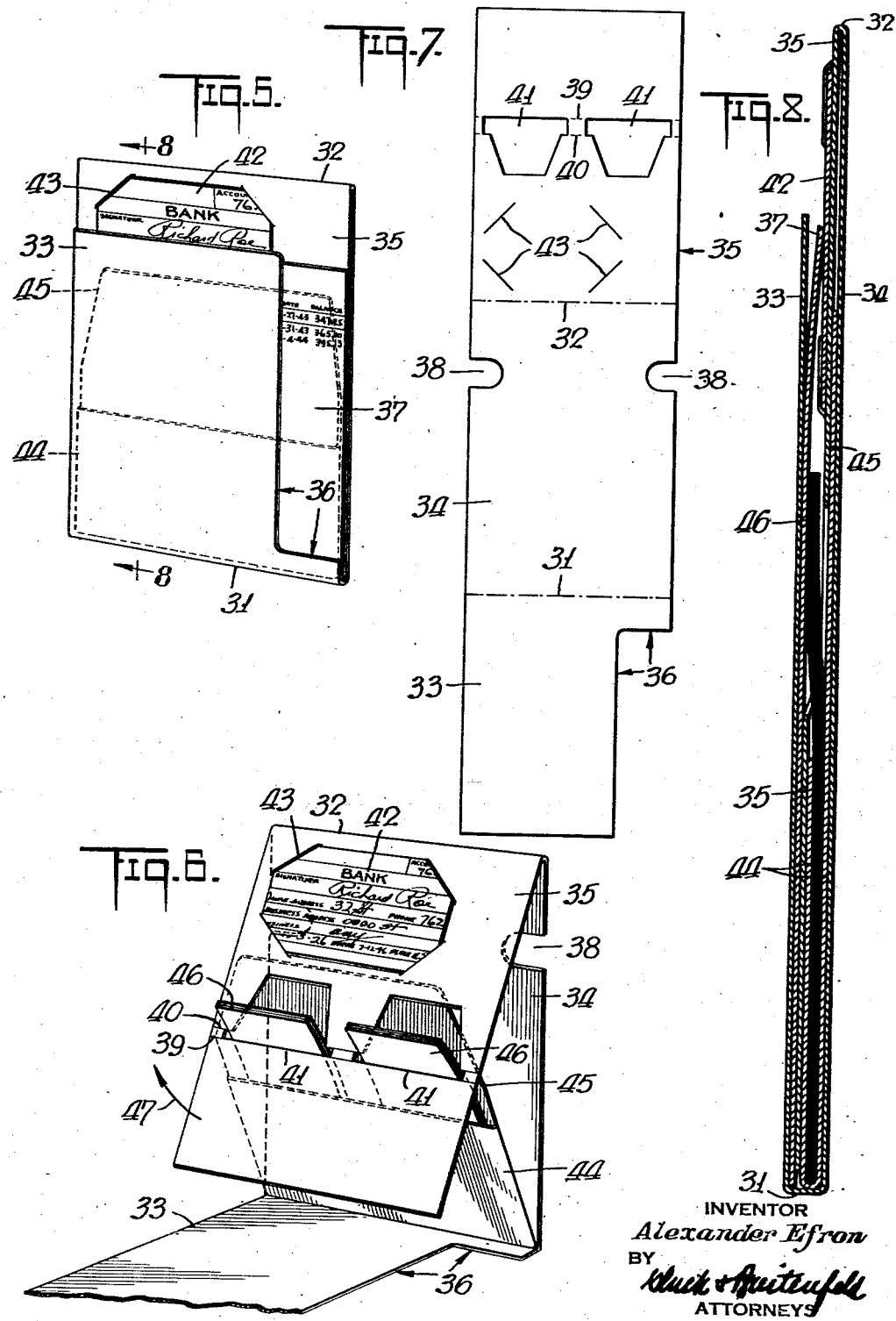

Patented Sept. 25, 1945

2,385,337

UNITED STATES PATENT OFFICE 2,385,337

FILING FOLDER

Alexander Efron, New York, N. Y., assignor to Checkmaster Plan Inc., New York, N. Y., a corporation of New York Application March 8, 1944, Serial No. 525,505

8 Claims. (Cl. 129—16.7)

My present invention relates generally to filing folders, and has particular reference to certain improvements in a folder of the kind which stands upright in a stack of similar folders arranged one behind the other.

A general object of my invention is to provide a filing folder of such special structural nature that it is admirably suited for use in connection with certain specialized bookkeeping procedures. The folder is primarily intended for use in banks, but it will be understood that certain phases of my invention are not necessarily restricted to the employment of the folder for such specific purpose. The invention is of such a character that it may prove to be applicable, by users or institutions other than banks, for purposes analagous to those hereinafter to be described.

In normal practice, a bank having checking-account customers maintains an individual record, in the form of a ledger sheet or statement, for each customer. As and when deposits are made by the customer, or checks of the customer are presented for payment, it becomes necessary for the bank to make suitable entries upon this ledger sheet, either charging or crediting the customer, as the case may be. In the case of checks presented for payment, it is necessary at the same time for the bank to compare the customer's signature with the "signature card" or similar record which the bank has on hand. At the end of each month or other regular accounting period, the bank usually furnishes a complete statement to the customer, showing the transactions which have taken place, and the resulting balance. At that time, it is also regular practice for the bank to return to the customer the cancelled checks or vouchers which have been paid.

This procedure obviously involves considerable time-consuming manipulations of signature cards, ledger sheets, check vouchers and the like. It has heretofore been recognized that the procedure can be simplified by providing an individual filing folder for each customer and retaining each customer's check vouchers in his particular folder at the time and place of the corresponding entries on the customer's ledger sheet. This practice has heretofore been adopted by a number of banks, but has given rise to an entirely different problem, viz., that of space. Thus, if a group of filing folders normally occupies, say, two feet of space in a filing cabinet or equivalent box or the like, the same folders may be found to require twice or three times this amount of space, or even more, after check vouchers have been accumulated over a period of time. This is due to the unavoidable bulk of such check vouchers, and the problem is complicated by the disparity of size between a conventional check and the size of a filing folder adequate to accommodate a ledger sheet.

It is one of the more particular objects of my present invention to provide a filing folder which is uniquely adapted to accommodate not only a ledger sheet of conventional character, but also an accumulation of check vouchers, without causing the undue increase in thickness, as vouchers accumulate, which has heretofore been encountered. My improved construction provides a means for safely accommodating and supporting an accumulation of check vouchers in a minimum amount of space.

A particular feature of my invention resides in the provision of a filing folder having means for supporting within it at least one stack, and preferably a plurality of stacks, of check vouchers, arranged end upwards. By means of this arrangement, I am enabled to achieve a more efficient correlation between the available area within the filing folder and the volume necessarily occupied by a multiplicity of accumulated check vouchers.

The present improved construction has an additional advantage in facilitating and speeding up the manipulations which are periodically required to remove the accumulated vouchers from their respective folders for the purpose of forwarding them to the bank's customers along with their respective statements. This procedure may be rendered uniquely efficient where certain modifications of the folder, hereinafter to be set forth, are resorted to.

A further feature of my invention lies in an arrangement whereby the present improved folder affords an opportunity for conveniently retaining the customer's signature card in direct association with the folder, thereby facilitating the work and time required not only in creating a folder for a newly established account, and in thereafter accurately identifying each filing folder and distinguishing it from others, but also in enabling the bookkeeper to verify signatures quickly and with a minimum amount of effort at the time and place that corresponding bookkeeping entries are to be made.

These advantages, and others, are achieved by means of a structure which is of extremely simple and inexpensive character, being preferably formed of a simple one-piece blank of cardboard or its equivalent.

I achieve the foregoing objects and advantages, and such other objects and advantages as may hereinafter appear or be pointed out, in the manner illustratively exemplified in the accompanying drawings in which:

Figure 1 is a perspective view of a filing folder embodying the features of the present invention and shown in closed condition;

Figure 2 is a similar view showing the folder opened;

Figure 3 is an enlarged cross-sectional view taken substantially along the line 3—3 of Figure 1;

Figure 4 is a plan view of the single blank of which the folder may be formed;

Figure 5 is a view similar to Figure 1, illustrating a modification;

Figure 6 is a perspective view of the folder of Figure 5, shown open, and showing how the folder is manipulated when accumulated vouchers are to be removed;

Figure 7 is a plan view of the single blank of which the folder of Figure 5 may be formed; and Figure 8 is an enlarged cross-sectional view taken substantially along the line 8—8 of Figure 5.

Referring first to Figures 1-4, I have found that in forming the folder it is advantageous to start with a substantially rectangular blank 10 of cardboard or the like, this blank being provided with transverse hinge lines 11 and 12 which divide the blank into the three sections 13, 14 and 15. The hinge lines are so arranged that the sections 13 and 14 may be folded into superposed relationship to define front and rear leaves, respectively, the front leaf being of slightly less height than the rear leaf as indicated most clearly in Figures 1 and 3. The section 15 is of such a size that it may be folded inwards into a position between the leaves 13 and 14 to define an intermediate panel which extends almost to the hinge line 11, as indicated most clearly in Figure 2.

For a purpose presently to be described, U-shaped cuts 16 are formed in the blank, extending partially across the hinge line 11, to define flaps 17 hinged to the leaf 13 along the hinge lines 18. The hinge lines 18 are parallel to the hinge line 11, and are relatively close to the latter so that the integral flaps 17 may be folded back onto the leaf 13 to form upstanding abutments of yieldable resilient character.

Adjacent to the hinge line 12 it is preferable to provide a narrow U-shaped cut 19 which forms an index tab 20 ultimately projecting upwardly from the panel 15 as shown in Figures 1 and 2.

The panel 15 is divided by transverse hinge lines 21 and 22 into an upper portion (lying between the hinge lines 12 and 22), a lower portion (lying between the hinge line 21 and the free edge of the panel), and a relatively narrow connector strip 23 lying between the hinge lines 21 and 22. In the connector strip 23, i. e., between the upper and lower portions of the panel 15, I provide at least one substantially rectangular slit or aperture. I have illustratively shown three such apertures arranged side by side in alignment with one another and designated by the reference numeral 24. For a purpose presently to be described, each aperture 24 communicates with a slightly narrower opening 25 formed in the upper portion of the panel 15 and extending for a substantial distance toward the hinge line 12.

The panel 15 is also provided with a series of U-shaped slits or cuts 26 arranged in a predetermined relationship so as to define integral tabs 27 as shown in Figure 2.

It will be observed that the blank 10 of Figure 4 is of simple and economical nature, and may be produced in large quantities and at low cost by simple stamping and scoring procedures. A supply of such blanks may be conveniently shipped and stored in compact stacked relationship, to be adjusted into folder form as and when required.

When a folder of the present improved character is to be created, the flaps 17 are first folded upwardly along the lines 18, and the blank 10 is then folded along the lines 11 and 12 so as to bring the parts into superposed relationships with the panel 15 arranged between the leaves 13 and 14, and with its lower portion behind the flaps 17. Apart from a further function which will presently be described, the flaps 17, due to the inherent resilience of the material along the hinge lines 18, serve yieldably to press and retain the panel 15 against the rear folder leaf 14, and serve also to constantly urge the front and rear leaves 13 and 14 into an opened or separated relationship.

By bending the panel 15 slightly, along the hinge lines 21 and 22, the lower portion of the panel is brought into a position spaced slightly forwardly from the rear leaf 14, as indicated most clearly in Figure 2, thereby forming a pocket between the lower portion of the panel 15 and the rear folder leaf 14. This serves to position the connector strip 23 in the slightly inclined relationship shown in Figure 2, so that the apertures 24 are readily receptive to the insertion through them, from the top, of the check vouchers which are to be accommodated in the pocket. The hinged relationship of the connector strip 23 serves also to permit expansion and contraction of the pocket.

When the folder is created, the customer's signature card 28 is inserted into the position shown, being engaged and supported by the tabs 27 so that the customer's name, account number, and similar identifying information are readily visible even when the folder is closed as shown in Figure 1. This card is intended to be permanently retained in association with the folder as long as the folder is employed for that particular customer, but obviously the card is retained in a removable fashion and may readily be replaced by another should this become desirable.

The index tab 20 is not absolutely essential, and is provided for the purpose of facilitating the operation of "thumbing" through a stack of folders without subjecting the signature cards 28 to undue handling. The tab 20 serves also as a convenient means for grasping the folder to permit its removal from a stack of similar folders. Obviously, if desired, additional indexing information or the like may be printed or otherwise provided on the tab 20.

At the time when the folder is created, with the customer's signature card 28 associated therewith, there is also inserted into the folder a ledger sheet 29. This sheet may be of any suitable size or character, and need not be described or illustrated in detail since such ledger sheets are well known per se. It may consist of a single ply or it may consist of two or more layers in superposed relationship with duplicating means, such as carbon paper or the like, arranged between the plies. The sheet 29 is preferably of such a size that it may find support upon the hinge lines 18

(see Figure 3) and will not project upwardly beyond the top edge of the front leaf 13.

The folder is then ready to be stacked or filed with other similar folders arranged one behind the other in a suitable filing cabinet or container, the pressure of these folders, one upon the other, serving to counteract the yieldable pressure of the resilient flaps 17, thereby keeping the folders in closed condition.

Whenever an entry is to be made upon a cutomer's ledger sheet, the customer's folder is separated from the other folders to an extent sufficient to permit the flaps 17 to urge the front and rear leaves 13 and 14 into separated relationship. The degree of separation need not be as great as that shown in Figure 2, the opening of the folder being shown in this Figure to an exaggerated extent to reveal the interior structure. The customer's ledger sheet is then withdrawn by the bookkeeper and after the suitable entries have been made, it is returned to the folder.

Whenever an entry being made by the bookkeeper arises from the presentation of a check which was drawn by the customer, the verification of the signature may be attended to expeditiously and in a minimum amount of time, since the customer's signature card 28 is directly at hand and need not be independently searched for or examined in any separate file. Furthermore, the check voucher may be immediately filed and stored in the present folder so that further handling or sorting procedures, with all the possibilities of error which such additional handling might entail, are completely avoided.

The retention of the check voucher is accomplished by merely inserting it endwise into one of the apertures 24. These apertures are so arranged with respect to the bottom hinge line 11 that when the voucher has been fully inserted into the pocket, its lower edge lies adjacent to the hinge line 11 while the upper end projects from the pocket. From time to time, additional check vouchers are thus inserted into the pocket in the form of a stack or stacks arranged end upwards. Where three apertures are formed, the pocket is thus enabled to accommodate three separate stacks. As a result of this arrangement many more vouchers may be accumulated in the present folder than in any conventional type of folder, without unduly enlarging the folder from front to back. Stated otherwise, a series of folders of the present character, arranged one behind the other in a filing cabinet or box, will accommodate an equal accumulation of check vouchers in considerably less over-all space than would ordinarily be required.

Merely by way of example, Figure 2 illustrates two stacks 30 of check vouchers, accommodated, respectively, in the two right-hand apertures 24. The aperture 24 at the left of this figure has not as yet been employed to accommodate any vouchers. It will be observed that the flaps 17 are so positioned that they serve as abutments for the lower ends of the stacks 30. Obviously, while three flaps 17 may be provided if desired, i. e., one for each stack of vouchers, two such flaps are sufficient for the purpose when they are arranged, as shown, in staggered relationship to the stacks which are to be accommodated.

The openings 25 in the upper portion of the panel 15 serve the purpose of allowing the upper portions of the stacks 30 to accommodate themselves more readily in substantially upright relationships to the folder as a whole.

At the end of the month or other regular accounting period, it is a relatively simple matter for an employee of the bank to reach into each folder, grasp and remove upwardly whatever stack or stacks of accumulated vouchers may be in the folder, and insert them, along with the customer's statement, into an envelope. If desired, the ledger sheet 29 may constitute this statement and it is thus possible for the employee directly to associate each bundle of accumulated vouchers with the corresponding statement, with a minimum possibility of error.

In the modification illustrated in Figures 5–8, the folder has been shown, for illustrative purposes, as being of a slightly narrower character intended to accommodate only two stacks of accumulated vouchers. In numerous other respects, as well, the folder of Figures 5–8 is slightly different in structure and mode of use from the folder of Figures 1–4.

Essentially, the folder is of the same generic character, being formed of a single blank of sheet material, such as cardboard, as illustrated in Figure 7. The blank is substantially rectangular and is divided by transverse hinge lines 31 and 32 into sections 33, 34 and 35. The section 33, when folded upwardly onto the section 34, forms the front leaf of the folder, and it will be observed that it is of slightly less height than the rear leaf 34. Along one margin, the front leaf 33 is provided with the cut-out 36, which permits the "balance" column of a ledger sheet 37 to be constantly visible without requiring that the folder be specially opened to reveal this information.

For a purpose presently to be described, the leaf 34 is provided near the hinge line 32 with the lateral recesses or openings 38, each of which is large enough to permit passage of a bookkeeper's finger.

The section 35 constitutes a panel which is folded downwardly, along the hinge line 32, into a position lying between the leaves 33 and 34. Two hinge lines 39 and 40 divide this panel into an upper portion (between the hinge lines 32 and 40), a lower portion (between the hinge line 39 and the free edge of the panel), and a relatively narrow connector strip lying between the hinge lines 39 and 40. Two apertures 41 are provided, side by side, in this connector strip, thereby defining openings through which vouchers may be inserted endwise into the pocket that is formed between the rear leaf 34 and the lower portion of the panel 35.

To accommodate a signature card 42, or similar element of informational character, the upper portion of the panel 35 is provided with the four slits 43 into which the corners of the card 42 may be tucked, in well-known fashion.

It will be observed that this folder is devoid of any upstanding tab at the upper edge defined by the hinge line 32, and is also devoid of any springy elements such as those shown at 17 in Figures 1–4. One reason why these abutments may be omitted arises from the fact that a mailing envelope 44 is intended to be used with this folder. This envelope is inserted into the folder through the open side of the pocket so that the lower edge of the envelope finds support along the hinge line 31, the envelope opening upwards and having its flap 45 lying flat against the rear leaf 34.

The folder has a length, parallel to the hinge line 31, sufficient to accommodate the mailing envelope 44 in the manner described; and the envelope, in turn, is of sufficient length so that its opening is receptively positioned with respect to the apertures 41 through which check vouchers are inserted.

When a customer's folder is first established, the parts are brought into the relationships shown in Figure 5. The signature card 42 serves to identify the folder, the balance sheet 37 is inserted between the front leaf 33 and the panel 35, and the mailing envelope 44 is positioned in the pocket, as described. Whenever an entry is to be made on the customer's ledger sheet, this sheet is withdrawn from the folder and subsequently reinserted into the folder, and the current "balance" is always visible for inspection. Where the accounting transaction involves the entry of a charge arising from the presentation of a customer's check, the check voucher is inserted directly into one or the other of the apertures 41, and its lower end thus finds support within the envelope 44. As these check vouchers accumulate during a selected accounting period, vertically-arranged stacks are formed, each stack having its upper portion projecting from the pocket and having its lower portion accommodated within the mailing envelope 44. For illustrative purposes, two such stacks 46 have been shown in Figure 6, and one of these stacks is shown in Figure 8.

When the time arrives for the periodic statement to be sent to the customer, along with the accumulated vouchers, the operator opens the folder as shown in Figure 6, and with the aid of the finger openings 38 he is enabled to swing the panel 35 forwardly and upwardly (in the direction of the arrow 47 of Figure 6) until the panel is clear of the upper ends of the stacks 46. During this manipulation, these stacks remain in position within the envelope 44, and the envelope itself remains in place. It is then a relatively simple matter to remove the envelope from the folder and to adjust the stack or stacks 46 through 90° so as to insert them fully within the confines of the envelope. If a statement is to accompany these vouchers, it is inserted into the envelope at the same time.

A new and empty envelope is then reinserted into the folder together with a new ledger sheet or statement, and the folder is then ready for use during the succeeding accounting period.

By constructing the folder in the manner shown, so that the storage of the check vouchers involves a direct insertion into the ultimate mailing envelope, the possibility of error is greatly minimized, as will be readily understood. This desirable result is achieved without any sacrifice of the space-saving features inherent in the basic concept of accommodating the vouchers in the form of a stack or stacks arranged end upwards in the folder.

Obviously, the advantageous features of the folder in Figure 5 may be incorporated in a folder having provision for three or more vertically-arranged stacks, and may be combined (should it prove desirable) with one or more of the other structural features shown in Figures 1–4.

In general, it will be understood that the details herein described and illustrated to explain the general nature of the invention may readily be modified by those skilled in the art without departing from the spirit and scope of the invention as expressed in the appended claims. Accordingly, these details, except as specifically set forth in the claims, are to be considered purely illustrative.

Having thus described my invention and illustrated its use, what I claim as new and desire to secure by Letters Patent is:

1. A filing folder comprising front and rear leaves hingedly connected only along their bottom edges, and means associated with one of said leaves for supporting within the folder at least one stack of check vouchers arranged end upwards, said means comprising a panel hinged to said leaf along the latter's upper edge and extending downwardly into the folder, said panel defining one wall of a pocket between said panel and leaf, said panel having a plurality of aligned apertures through which said vouchers may be inserted endwise into said pocket in separate stacks.

2. A filing folder comprising front and rear leaves hingedly connected only along their bottom edges, and means associated with one of said leaves for supporting within the folder at least one stack of check vouchers arranged end upwards, said means comprising a panel hinged to said leaf along the latter's upper edge and extending downwardly into the folder, said panel having an upper portion lying flat against said leaf, a lower portion spaced slightly from said leaf and defining one wall of a pocket between said panel and leaf, said panel being provided in the region between said portions with a plurality of aligned apertures through which said vouchers may be inserted endwise into said pocket in separate stacks.

3. A filing folder comprising front and rear leaves hingedly connected only along their bottom edges, and means associated with one of said leaves for supporting within the folder at least one stack of check vouchers arranged end upwards, said means comprising a panel hinged to said leaf along the latter's upper edge and extending downwardly into the folder, said panel having an upper portion lying flat against said leaf, a lower portion spaced slightly from said leaf and defining one wall of a pocket between said panel and leaf, and an inclined connector strip between said portions and hinged thereto to allow expansion and contraction of said pocket, said panel being provided with a plurality of apertures arranged side by side in said connector strip through which said vouchers may be inserted endwise into said pocket in separate stacks, said connector strip being so positioned with respect to the lower hinge line of the folder that the lower end of each stack will lie adjacent to said hinge line while the upper end projects out of said pocket through the corresponding aperture.

4. A filing folder as set forth in claim 2, said upper portion of the panel having openings therein narrower than and communicating respectively with said apertures to facilitate the accommodation of the upper ends of said stacks.

5. A filing folder comprising a single blank of cardboard or the like folded upon itself along parallel lines to define front and rear leaves hingedly connected only along their bottom edges and a panel lying between said leaves and hingedly connected only at its upper edge to the upper edge of one of said leaves, the lower portion of said panel defining one wall of a pocket between said panel and the leaf to which it is hinged, and a plurality of aligned apertures in the midportion of said panel through which check vouchers may be inserted endwise into said pocket in the form of separate stacks each of which is thereby supported end upwards within the folder.

6. The combination with a filing folder as set forth in claim 1, of a mailing envelope arranged at the bottom of said pocket with its opening upwards so as to receive and accommodate the lower ends of said stacks.

7. A banker's filing folder of the kind which stands upright in a stack of similar folders arranged one behind the other, said folder comprising front and rear leaves hingedly connected only along their bottom edges, said leaves being of such size as to accommodate between them a flat forwardly-facing ledger sheet of a banking customer, the front leaf having a lateral edge cut back to form a vertical recess through which the balance column of said ledger sheet is constantly exposed, and a panel hinged along its upper edge to the upper edge of the rear leaf and extending downwardly into the folder behind said ledger sheet, said panel and rear leaf defining a pocket between them, said panel being provided in its midportion with spaced aligned apertures through which the customer's check vouchers corresponding to the entries on said ledger sheet may be inserted endwise into said pocket in the form of separate stacks each of which is thereby supported end upwards within the folder behind said ledger sheet.

8. A banker's filing folder comprising the combination, with the structure and elements set forth in claim 7, of a mailing envelope removably accommodated within said pocket and resting upon the lower hinge line of the folder, said envelope having its mouth upward and its flap lying open against the rear leaf of the folder so that said stacks extend downwardly directly into said envelope.

ALEXANDER EFRON.